United States Patent
Kaifuchi et al.

(10) Patent No.: US 10,073,235 B2
(45) Date of Patent: Sep. 11, 2018

(54) OPTICAL DEVICE, METHOD OF MANUFACTURING OPTICAL DEVICE, AND OPTICAL ISOLATOR

(71) Applicant: Fujikura Ltd., Tokyo (JP)

(72) Inventors: Yoshikazu Kaifuchi, Sakura (JP); Yukihiko Takahashi, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 28 days.

(21) Appl. No.: 15/024,318

(22) PCT Filed: Aug. 29, 2014

(86) PCT No.: PCT/JP2014/072705
§ 371 (c)(1),
(2) Date: Mar. 23, 2016

(87) PCT Pub. No.: WO2015/045729
PCT Pub. Date: Apr. 2, 2015

(65) Prior Publication Data
US 2016/0216473 A1    Jul. 28, 2016

(30) Foreign Application Priority Data
Sep. 24, 2013   (JP) .................................. 2013-197048

(51) Int. Cl.
*G02B 5/30* (2006.01)
*G02B 27/28* (2006.01)
(Continued)

(52) U.S. Cl.
CPC ............. *G02B 7/003* (2013.01); *G02B 27/28* (2013.01); *G02B 27/286* (2013.01); *G02F 1/093* (2013.01)

(58) Field of Classification Search
CPC .... G02B 6/2746; G02B 27/28; G02B 5/3083; G02B 27/286; G02B 27/283;
(Continued)

(56) References Cited

U.S. PATENT DOCUMENTS 6,600,601 B1 *   7/2003   Ikari .................... G02F 1/093
                                                              359/281
2013/0170785 A1 *  7/2013   Gao ..................... G02F 1/093
                                                                385/8

FOREIGN PATENT DOCUMENTS

CN        101782693 A      7/2010
CN        103278943 A      9/2013
(Continued)

OTHER PUBLICATIONS

JPO 2003156713 Machine translation.*
(Continued)

*Primary Examiner* — Thomas K Pham
*Assistant Examiner* — Sharrief Broome
(74) *Attorney, Agent, or Firm* — Sughrue Mion, PLLC

(57) ABSTRACT

An optical device includes: a plurality of optical components arranged along a first direction, each optical component having an optical surface, a first surface intersecting with the optical surface, and a second surface intersecting with the optical surface and the first surface; and a base member that integrally holds the plurality of the optical components and has a first holding surface and a second holding surface, the first holding surface holding the optical components and fixing positions of the optical components in a second direction intersecting with the first direction in a state of being in contact with the optical components on the first surface, the second holding surface holding the second surface of the optical components with an adhesive interposed therebetween and fixing positions of the optical (Continued)

components in a third direction intersecting with the first direction and the second direction.

18 Claims, 13 Drawing Sheets

(51) Int. Cl.
*G02B 7/00* (2006.01)
*G02F 1/09* (2006.01)

(58) Field of Classification Search
CPC .... G02B 5/3025; G02B 6/4208; G02B 6/272; G02B 27/281; G02B 6/2773; G02B 6/32; G02B 5/3058; G02B 6/12007; G02B 6/3845; G02B 1/00; G02B 27/288; G02B 5/22
See application file for complete search history.

(56) References Cited

FOREIGN PATENT DOCUMENTS

| JP | 6-95034 A | 4/1994 |
|----|-----------|--------|
| JP | 6-208048 A | 7/1994 |
| JP | 7-36109 U | 7/1995 |
| JP | 2002196282 A | 7/2002 |
| JP | 2003-131099 A | 5/2003 |
| JP | 2003-156713 A | 5/2003 |
| JP | 2003156713 A * | 5/2003 |
| JP | 2004061886 A | 2/2004 |
| JP | 2004-258268 A | 9/2004 |
| JP | 2004-354646 A | 12/2004 |
| JP | 2004354646 A * | 12/2004 |
| JP | 2005-49405 A | 2/2005 |
| JP | 2005-157010 A | 6/2005 |
| JP | 2005283697 A | 10/2005 |
| JP | 2006-126563 A | 5/2006 |
| JP | 2007-101652 A | 4/2007 |
| JP | 4683916 B2 | 5/2011 |

OTHER PUBLICATIONS

JPO 2004354646 Machine translation.*
Communication dated Apr. 4, 2017, from the European Patent Office in counterpart European Application No. 14849747.2.
International Search Report for PCT/JP2014/072705 dated Sep. 30, 2014.
Japanese Office Action for JP Application No. 2013-197048 dated Jul. 29, 2014.
Japanese Notice of Allowance for JP Application No. 2013-197048 dated Nov. 4, 2014.
Communication dated May 3, 2017, from the State Intellectual Property Office of People's Republic of China in corresponding Application No. 201480052401.X.

* cited by examiner

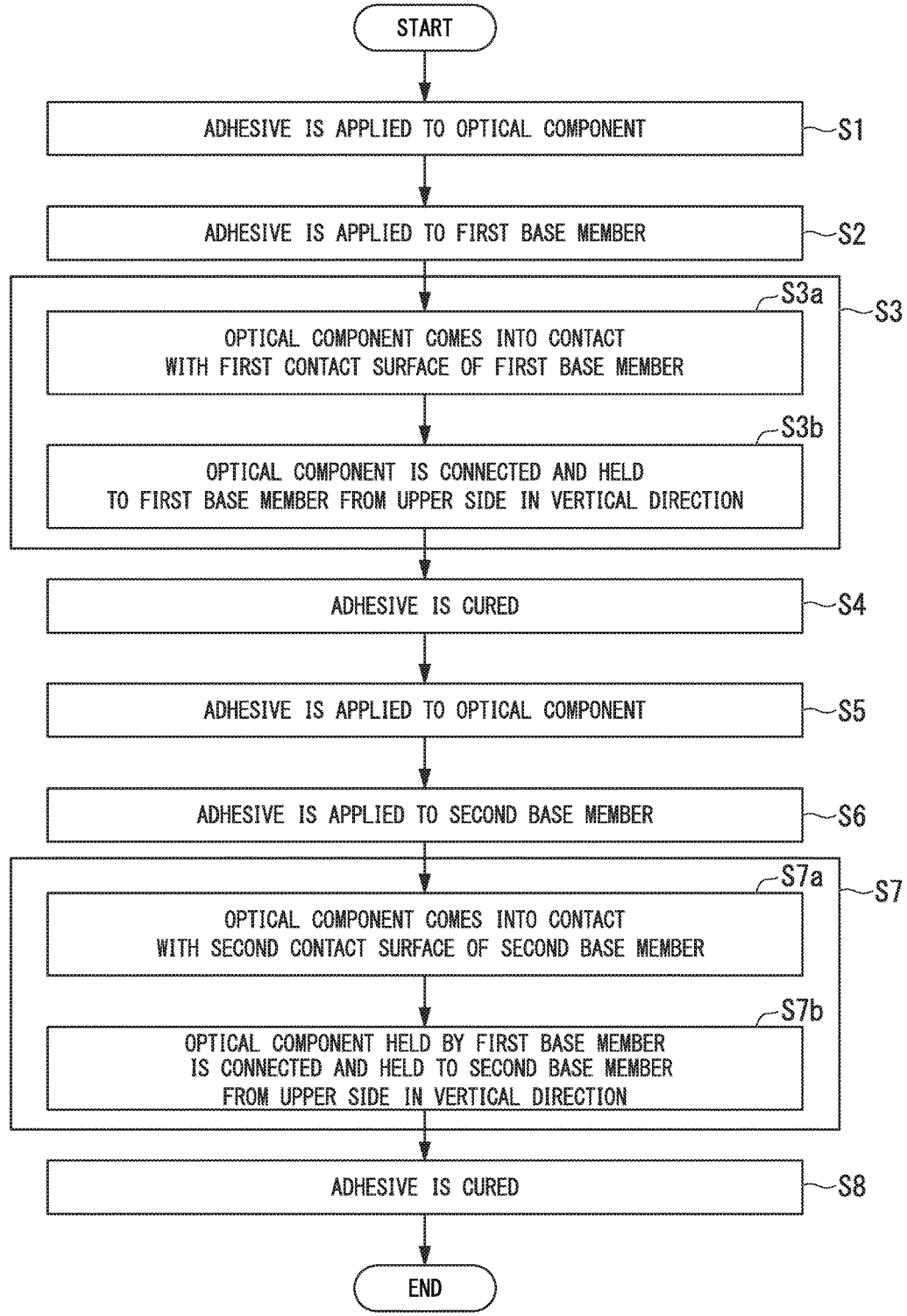

OPTICAL DEVICE, METHOD OF MANUFACTURING OPTICAL DEVICE, AND OPTICAL ISOLATOR

CROSS REFERENCE TO RELATED APPLICATION

This application is a National Stage of International Application No. PCT/JP2014/072705 filed Aug. 29, 2014, claiming priority based on Japanese Patent Application No. 2013-197048 filed on Sep. 24, 2013, the contents of all of which are incorporated herein by reference in their entirety.

BACKGROUND OF THE INVENTION

Field of the Invention

The present invention relates to an optical device, a method of manufacturing an optical device, and an optical isolator.

Description of Related Art

Regarding an optical device configured to include a plurality of optical components, a method has been proposed which reduces displacement of each component from an appropriate position or an appropriate angle by devising ways for adhesively-attaching the plurality of the optical components to each other (for example, Japanese Patent No. 4683916 and Japanese Examined Utility Model Application, First Publication No. H7-36109).

Japanese Patent No. 4683916 discloses a method of filling a recess provided on a substrate with a binding material so that the binding material overflows therefrom and thereafter fixing an optical component on the substrate with the binding material interposed therebetween.

Japanese Examined Utility Model Application, First Publication No. H7-36109 discloses a method of fixing an optical component on a fixing member by filling a groove provided on the fixing member with an adhesive.

However, in the optical component fixing methods disclosed by Japanese Patent No. 4683916 and Japanese Examined Utility Model Application, First Publication No. H7-36109, when the optical component is adhered to the substrate, the angle at which the optical component is provided thereon may be misaligned with respect to a desired angle. In this case, there is the possibility of not obtaining predetermined optical characteristics required for optical devices.

SUMMARY OF THE INVENTION

The invention was made with respect to the above-described problems, and has an object to provide an optical device including a plurality of optical components which are arranged on a base member with a high degree of accuracy, a method of manufacturing the optical device, and an optical isolator using the optical device.

An optical device according to a first aspect of the invention includes: a plurality of optical components arranged along a first direction, each optical component having an optical surface, a first surface intersecting with the optical surface, and a second surface intersecting with the optical surface and the first surface; and a base member that integrally holds the plurality of the optical components and has a first holding surface and a second holding surface, the first holding surface holding the optical components and fixing positions of the optical components in a second direction intersecting with the first direction in a state of being in contact with the optical components on the first surface, the second holding surface holding the second surface of the optical components with an adhesive interposed therebetween and fixing positions of the optical components in a third direction intersecting with the first direction and the second direction.

With this configuration, the positions of the first surfaces of the plurality of the optical components are fixed in the second direction by the first holding surface of the base member. Additionally, the positions of the second surfaces of the plurality of the optical components are fixed in the third direction by the second holding surface of the base member. Consequently, in a state where the positions of the optical surfaces of the plurality of the optical components which intersect with the first surfaces and the second surfaces are fixed in the second direction and the third direction with a high degree of accuracy, the plurality of the optical components are held by the base member, and the optical components and the base member are integrated into one body. Moreover, since the adhesive is interposed between the second surface and the second holding surface, the second surface is adhesively attached to the second holding surface, and the plurality of the optical components are fixed to the base member.

As a result, the optical device having the plurality of the optical components which are disposed on the base member with a high degree of accuracy is obtained.

In the optical device according to the first aspect of the invention, the base member may be configured to include the index serving as the mark used to fix the position of the optical surface in the first direction.

With this configuration, a method of using the index as the mark and fixing the positions of the plurality of the optical surfaces in the first direction can be adopted when the plurality of the optical components are held by the base member. Accordingly, the optical device having the plurality of the optical components which are disposed in the first direction with a high degree of accuracy is obtained.

In the optical device according to the first aspect of the invention, the base member may be configured to include a first wall having the first holding surface and the index may be configured to include an index hole that penetrates through the first wall in the range in the first direction of the optical surface.

With this configuration, since the index hole penetrates through the first wall in the range in the first direction of the optical surface, a method of using the index hole as the mark and fixing the position of the optical surface in the first direction can be adopted.

In the optical device according to the first aspect of the invention, the base member may be configured to include a second wall having the second holding surface, and the second wall may be configured to have a first hole that penetrates through the second wall in the range including at least part of a region intersecting with the optical surface on the second holding surface.

With this configuration, the first hole is provided on the second wall having the second holding surface. The first hole includes at least part of the region intersecting with the optical surface on the second holding surface and penetrates through the second wall. In other words, the optical surface is located on the first hole. Accordingly, when the second holding surface of the first base member is adhesively attached to the second surfaces of the plurality of the optical components, since the excess adhesive is discharged from the first hole to the outside, the adhesive is prevented from coming around the optical surface. As a result, the optical device having a high degree of reliability is obtained.

In the optical device according to the first aspect of the invention, the area of the second surface may be larger than the area of the first surface.

With this configuration, since the area of the second surface which is adhesively attached to the second holding surface of the base member with the adhesive interposed therebetween is larger than that of the first surface, an optical device having a high degree of adhesion strength between the plurality of the optical components is obtained.

In the optical device according to the first aspect of the invention, the optical component may be formed in a rectangular shape in which a direction thereof intersects with the first direction and has a third surface disposed at a position opposite to the first surface and a fourth surface disposed at a position opposite to the second surface, and the optical device may be configured to include a second base member including: a third holding surface that comes into contact with the third surface and holds the optical components; and a fourth holding surface that holds the fourth surface of the optical component with an adhesive interposed therebetween.

With this configuration, since the optical components which are each formed in a rectangular shape in cross section are held by both the base member and the second base member, the optical device having a high degree of adhesion strength between the plurality of the optical components is obtained.

In the optical device according to the first aspect of the invention, the optical component may be formed in a rectangular shape in which a direction thereof intersects with the first direction and has a third surface disposed at a position opposite to the first surface and a fourth surface disposed at a position opposite to the second surface, the base member may be configured to include a third holding surface that comes into contact with the third surface and holds the optical components, and the optical device may be configured to include a second base member including a fourth holding surface that holds the fourth surface of the optical component with an adhesive interposed therebetween.

With this configuration, since the optical components which are each formed in a rectangular shape in cross section are held by both the base member and the second base member, the optical device having a high degree of adhesion strength between the plurality of the optical components is obtained.

In the optical device according to the first aspect of the invention, the second base member may be configured to include a third wall having the third holding surface and a fourth wall having the fourth holding surface, and the fourth wall may be configured to have a second hole that penetrates through the fourth wall in the range including at least part of a region intersecting with the optical surface on the fourth holding surface.

With this configuration, the second hole is provided on the fourth wall having the fourth holding surface. The second hole includes at least part of the region intersecting with the optical surface on the fourth holding surface and penetrates through the fourth wall. In other words, the optical surface is located on the second hole. Accordingly, when the fourth holding surface of the second base member is adhesively attached to the fourth surfaces of the plurality of the optical components, since the excess adhesive is discharged from the second hole to the outside, the adhesive is prevented from coming around the optical surface. As a result, the optical device having a high degree of reliability is obtained.

In the optical device according to the first aspect of the invention, the adhesive may be an elastic adhesive.

When the optical components and the base member are thermally-expanded, since the coefficient of thermal expansion of the optical component is different from that of the base member, a stress may be generated between the optical component and the base member. In the case where the stress is applied to the optical component, the properties of the optical component changes, the optical characteristics of the optical component may be degraded.

In contrast, with the above configuration, since the stress that is generated between the optical component and the base member is absorbed by the elastic adhesive, it is possible to prevent the optical characteristics of the optical component from being degraded.

An optical isolator according to a second aspect of the invention includes the optical device according to the aforementioned first aspect.

With this configuration, the optical isolator having a high degree of reliability is obtained.

A method of manufacturing an optical device according to a third aspect of the invention includes: preparing a base member having a first holding surface and a second holding surface; preparing a plurality of optical components, each optical component having an optical surface, a first surface intersecting with the optical surface, and a second surface intersecting with the optical surface and the first surface; causing the first surface intersecting with the optical surface of the optical components to come into contact with the first holding surface of the base member; fixing positions of the optical components in a second direction intersecting with a first direction and holding the optical components; holding the second surface intersecting with the optical surface and the first surface of the optical component on the second holding surface of the base member with an adhesive interposed therebetween; fixing positions of the optical components in a third direction intersecting with the first direction and the second direction; and holding the plurality of the optical components on the base member along the first direction (holding step).

According to this method, it is possible to fix the positions of the plurality of the optical components in the second direction and the third direction with a high degree of accuracy.

The method of manufacturing an optical device according to the third aspect of the invention further includes: supplying the adhesive to the second surface of the optical component; supplying the adhesive to the second holding surface of the base member; and connecting the second surface to which the adhesive is supplied and the second holding surface to which the adhesive is supplied.

According to this method, since the adhesive is supplied to both the second surface of the optical component and the second holding surface of the base member, it is possible to prevent an air space from being generated at the adhesive interface when the second surface is adhesively attached to the second holding surface. Consequently, the optical device having a high degree of adhesion strength between the optical components is obtained.

In the method of manufacturing an optical device according to the third aspect of the invention, a second base member that includes a third wall having a third holding surface and a fourth wall having a fourth holding surface is prepared, and the optical components held by the base member are inverted and the optical components are held by the second base member (second holding step). When the optical components are inverted and held by the second base member, a third surface disposed at a position opposite to the first surface of the optical component comes into contact with the third holding surface of the second base member, and a fourth surface disposed at a position opposite to the second surface of the optical component is held by the fourth holding surface of the second base member with an adhesive interposed therebetween. The base member includes a first wall having the first holding surface and a second wall having the second holding surface, the second wall has a first hole that penetrates through the second wall in the range including at least part of a region intersecting with the optical surface on the second holding surface, and the fourth wall has a second hole that penetrates through the fourth wall in the range including at least part of a region intersecting with the optical surface on the fourth holding surface. When the plurality of the optical components are arranged on the base member along the first direction, the plurality of the optical components are directed to the base member from above in a vertical direction and are held by the base member. When the optical components are inverted and held by the second base member, the plurality of the optical components held by the base member may be directed to the second base member from an upper side in a vertical direction and are held by the second base member.

According to this method, in the holding step, the optical components are directed to the base member from the upper side in a vertical direction and are held by the base member. In other words, regarding the second holding surface of the base member and the second surface of the optical component, the optical components are held by the base member in a state where the second holding surface is located at the lower side in the vertical direction. Consequently, the excess adhesive is discharged from the first hole to the lower side in the vertical direction.

Moreover, in the second holding step, the optical components held by the base member is inverted, and the optical components are directed to the second base member from the upper side in the vertical direction and are held by the second base member. In other words, regarding the fourth holding surface of the second base member and the fourth surface of the optical component, the optical components are held by the second base member in a state where the fourth holding surface is located at the lower side in the vertical direction. Consequently, the excess adhesive is discharged from the second hole to the lower side in the vertical direction.

As described above, when the plurality of the optical components are held by the base member and the second base member, even in the case where the amount of the adhesive is excessive, the excess adhesive is discharged through each of the first hole and the second hole. As a result, the adhesive is prevented from coming around the optical surface, and the optical device having a high degree of reliability is obtained.

Effects of the Invention

According to the aspects of the invention, an optical device including a plurality of optical components which are arranged on a base member with a high degree of accuracy, a method of manufacturing the optical device, and an optical isolator using the optical device, are provided.

BRIEF DESCRIPTION OF THE DRAWINGS

FIG. 6 is a flowchart showing a method of manufacturing the optical crystal assembly according to the first embodiment.

DETAILED DESCRIPTION OF THE INVENTION

Hereinafter, an optical device according to an embodiment of the invention will be described with reference to drawings.

Particularly, the scope of the invention is not limited to the following embodiments, and modifications can be made without departing from the technical concept and scope of the invention. Moreover, in these drawings in the following explanation, appropriate changes have been made in the scale and the number of the various components as compared with practical components, in order to represent them at scales at which they can be easily understood.

In the embodiment, an optical crystal assembly used in a polarization-independent optical isolator will be described as an example of an optical device.

Firstly, a first embodiment will be described.

Figure 1A:
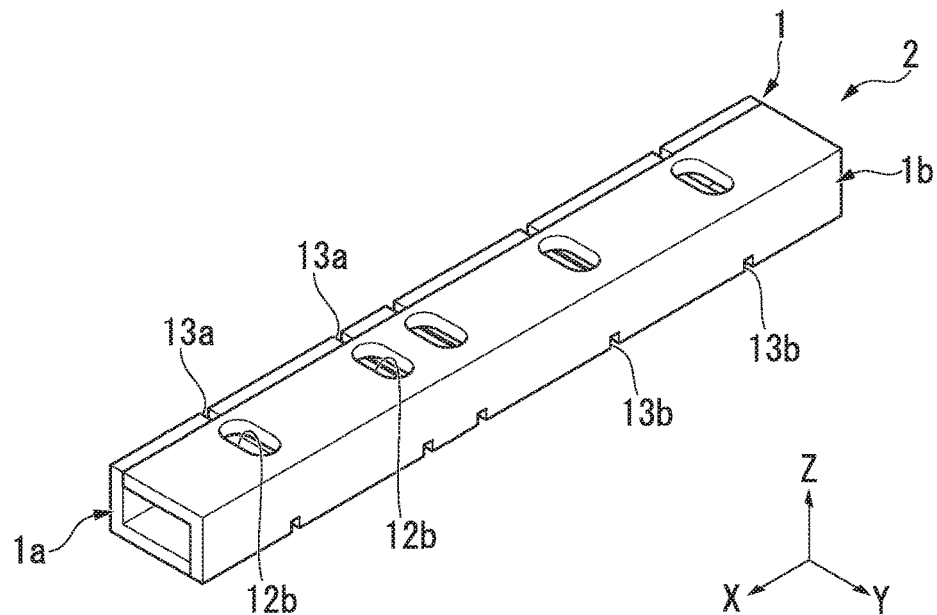
FIG. 1A is a perspective view showing an optical crystal assembly according to a first embodiment.
Figure 1B:
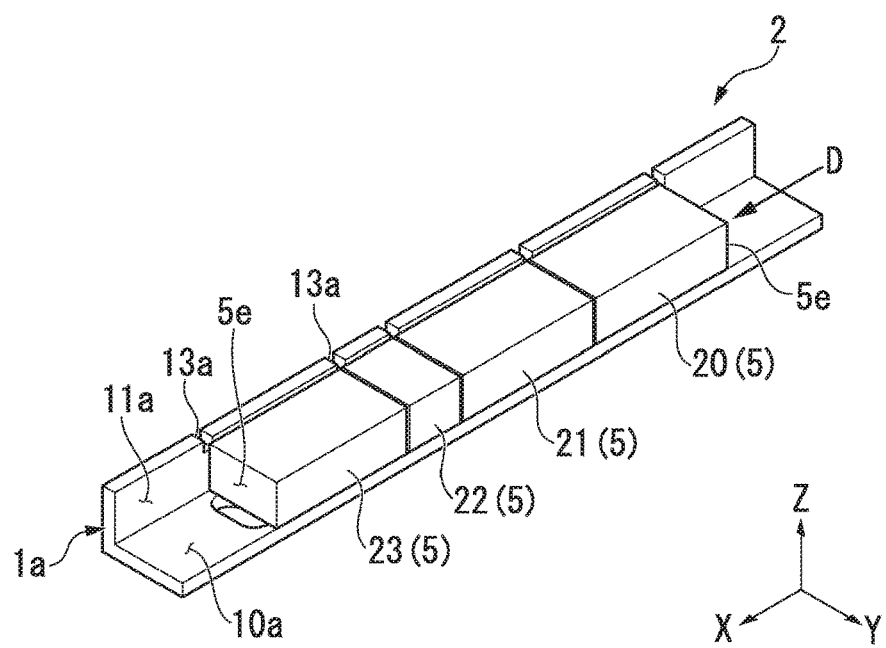
FIG. 1B is a perspective view showing the optical crystal assembly according to the first embodiment.
Figure 2A:
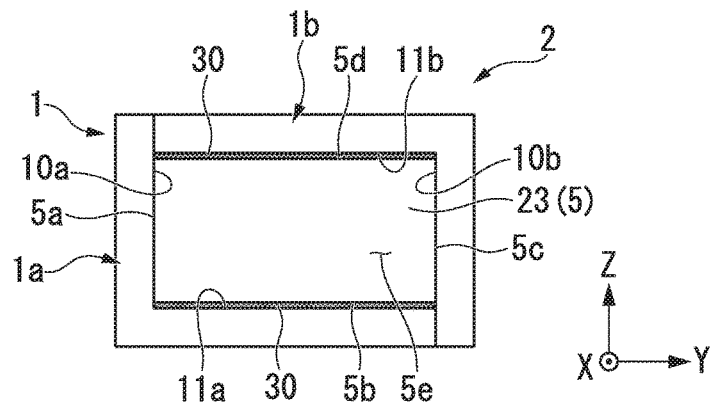
FIG. 2A is a front view showing the optical crystal assembly according to the first embodiment.
Figure 2B:
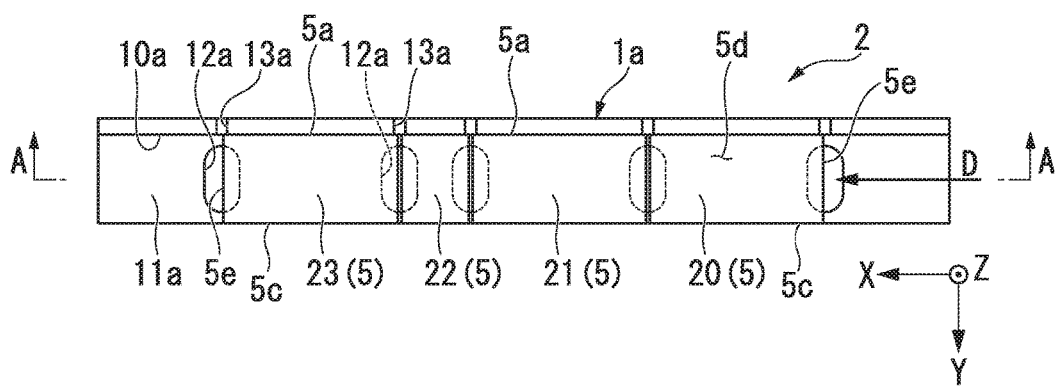
FIG. 2B is a plan view showing the optical crystal assembly according to the first embodiment.
Figure 2C:
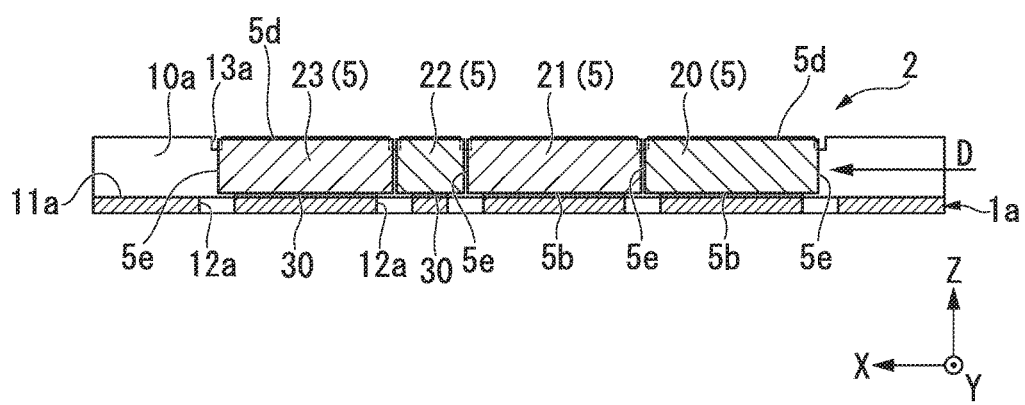
FIG. 2C is a view showing the optical crystal assembly according to the first embodiment and is a cross-sectional view taken along the line A-A shown in FIG. 2B.

FIGS. 1A, 1B, 2A, 2B, and 2C are views showing an optical crystal assembly 2 (optical device) according to the embodiment. FIGS. 1A and 1B are perspective views. FIG. 2A is a front view (YZ surface). FIG. 2B is a plan view (XY surface). FIG. 2C is a cross-sectional view (ZX surface) taken along the line A-A shown in FIG. 2B. In FIGS. 1B, 2B, and 2C, a second base member 1b is not shown.

Particularly, in the following explanation, the XYZ coordinate system is used, and the positional relationship between various members will be described with reference to the XYZ coordinate system. Here, the direction in which a base unit 1 extends (refer to FIGS. 1A and 1B) is the X-axial direction (first direction), the vertical direction is the Z-axial direction (third direction), and the direction orthogonal to both the X-axial direction and the Z-axial direction is the Y-axial direction (second direction). In addition, in the Z-axial direction, the upward vertical direction is referred to as "+" direction. Moreover, in the following explanation, the extending direction represents the longitudinal direction of the base unit 1 (X-axial direction, first direction).

The optical crystal assembly 2 according to the embodiment includes a plurality of optical components 5, and the base unit 1 as shown in FIGS. 1A, 1B, 2A, 2B, and 2C.

As shown in FIGS. 1B, 2B, and 2C, as the specific example of the plurality of the optical components 5, the optical crystal assembly 2 according to the embodiment includes a first polarizer 20, a faraday rotator 21, a wave plate 22, and a second polarizer 23. In the optical components 5, the first polarizer 20, the faraday rotator 21, the wave plate 22, and the second polarizer 23 are arranged straight in line in this order. Light is incident into the optical components 5 in the direction parallel to the array direction (X-axial direction) of the optical components 5. The arrow shown in drawing represents the direction D in which light enters the optical components 5 in the forward direction.

As the first polarizer 20 and the second polarizer 23, for example, yttrium vanadate ($YVO_4$) crystal can be used.

As the wave plate 22, for example, a $\lambda/2$ plate can be used.

The faraday rotator 21 is formed of crystals which produce the Faraday effect. The Faraday effect is a phenomenon in which the plane of polarization of light rotates due to the application of a magnetic field. As a crystal which produces the Faraday effect, for example, $Tb_3Ga_5O_{12}$ (TGG: Terbium Gllium Garnet) single crystal or $Y_3Fe_5O_{12}$ (YIG: Yttrium Iron Garnet) single crystal is adopted. The plane of polarization of the faraday rotator 21 rotates due to a magnetic field which is applied from a magnetic circuit.

Each of the optical components 5 is formed in a rectangular parallelepiped shape. As shown in FIG. 2A, the optical component 5 has a first surface 5a, a second surface 5b, a third surface 5c, a fourth surface 5d, and an optical surface 5e. The first surface 5a is parallel to the third surface 5c. The second surface 5b is parallel to the fourth surface 5d. The first surface 5a and the third surface 5c are orthogonal to the second surface 5b and the fourth surface 5d, respectively. In other words, the cross-sectional surface (YZ cross-section) in the direction intersecting the optical component 5 in the extending direction of (X-axial direction) is formed in a rectangular shape. The area of the second surface 5b of the optical component 5 is larger than the area of the first surface 5a. The area of the fourth surface 5d of the optical component 5 is larger than the area of the third surface 5c.

The optical surface 5e intersects with the first surface 5a, the second surface 5b, the third surface 5c, and the fourth surface 5d.

That is, as shown FIGS. 2B and 2C, each of the optical components 5 is arranged so as to intersect with the direction (X-axial direction) in which light is incident to the optical surface 5e thereof.

In the embodiment, as shown in FIG. 2B, the shapes of the first polarizer 20 and the second polarizer 23 in plan view (XY surface) are each formed in a rectangular shape; however, practically, for example, the shape other than the rectangular shape such as a parallelogram shape may be adopted.

Figure 3:
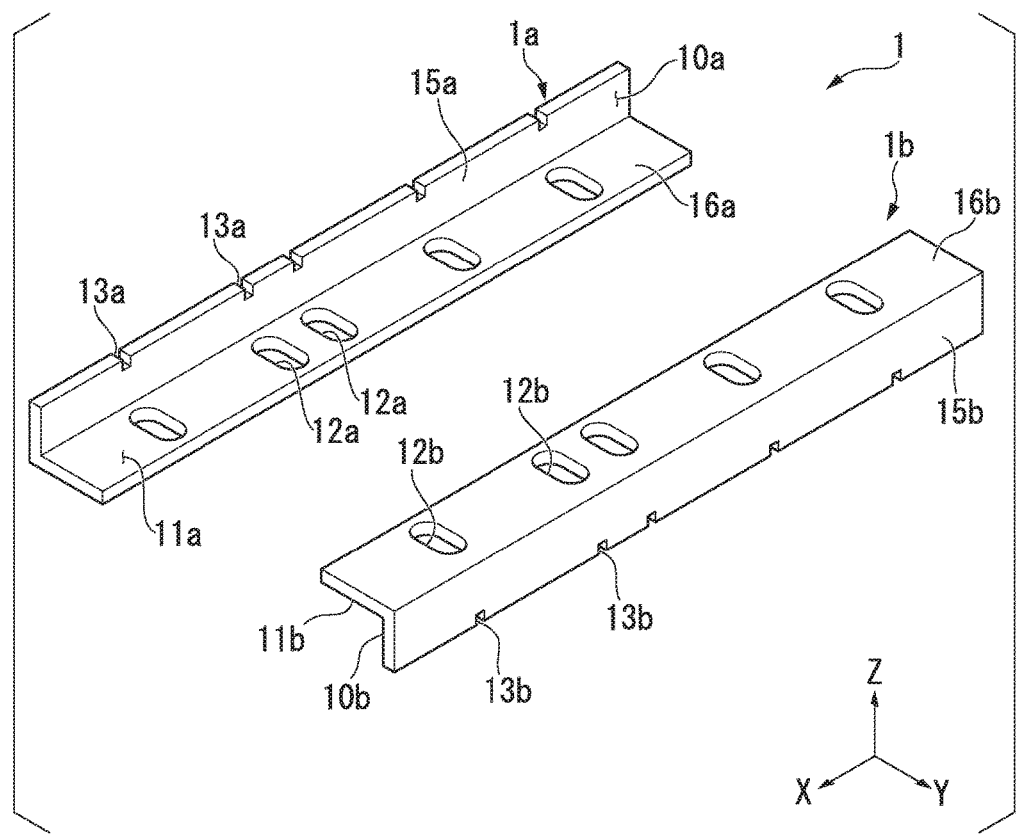
FIG. 3 is a perspective view showing a base unit according to the first embodiment.

FIG. 3 is a perspective view showing the base unit 1.

As shown in FIG. 3, the base unit 1 includes a first base member 1a and a second base member 1b. The first base member 1a and the second base member 1b are formed in the same shape. As shown in FIG. 2A, the base unit 1 sandwiches and holds the optical components 5 between the first base member 1a and the second base member 1b.

Figure 4A:
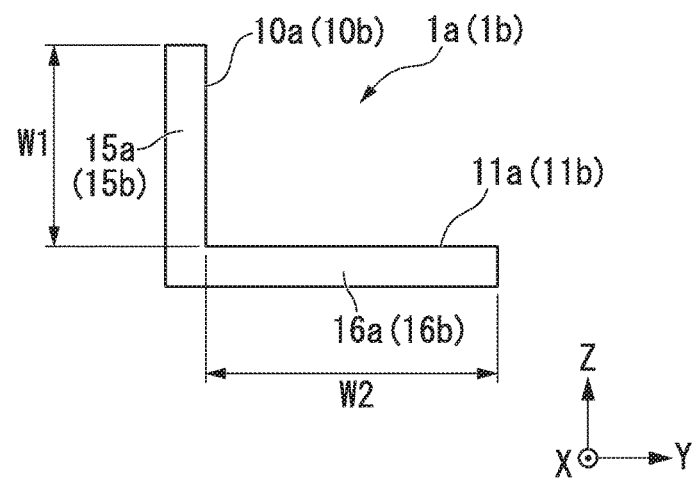
FIG. 4A is a front view showing the base unit according to the first embodiment.
Figure 4B:
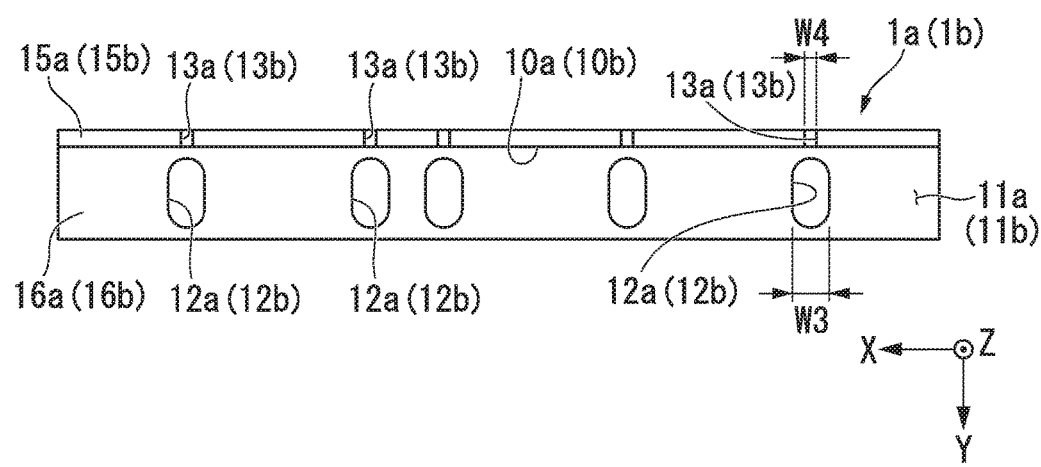
FIG. 4B is a plan view showing the base unit according to the first embodiment.

FIG. 4A is a front view (YZ surface) showing the first base member 1a (second base member 1b) of the base unit 1. FIG. 4B is a plan view (XY surface) showing the first base member 1a (second base member 1b) of the base unit 1.

As shown in FIGS. 3 and 4B, the first base member 1a is the member having the shape such that plates having long length are orthogonally connected to each other at the edges thereof. The shape of the first base member 1a in front view is an L-shape as shown in FIG. 4A. The first base member 1a has a first wall 15a having a first holding surface 10a and a second wall 16a having a second holding surface 11a.

The long sides of the first wall 15a and the second wall 16a are connected to each other so that the first holding surface 10a is perpendicular to the second holding surface 11a. The width W2 of the second holding surface 11a of the second wall 16a is greater than the width W1 of the first holding surface 10a of the first wall 15a. Consequently, since the length of the first holding surface 10a is the same as that of the second holding surface 11a, the area of the second holding surface 11a is larger than the area of the first holding surface 10a.

As shown in FIG. 4B, a plurality of first holes 12a are formed on the second holding surface 11a of the second wall 16a so as to be arranged along the extending direction (X-axial direction). The first holes 12a penetrate through the second wall 16a in the thickness direction of the second holding surface 11a (Z-axial direction). The position of the first hole 12a is determined in accordance with the position of the optical surface 5e when the plurality of the optical components 5 are arranged to align on the first base member 1a. That is, the first holes 12a are provided so that one side of the optical surface 5e overlaps the first hole 12a in plan view when the optical components 5 are disposed at predetermined positions. In other words, the first holes 12a are formed so as to include at least part of the region at which the optical surface 5e intersects with the second holding surface 11a. As long as an adhesive 30 which will be described later can be discharged through the first hole 12a in plan view (XY surface), the shape thereof is not particularly limited. For example, in the embodiment, the shape of the first hole 12a in plan view is an oval shape. Additionally, in the embodiment, one side of each of the two optical surface 5e of the adjacent optical components 5 which are opposed to each other overlaps a first hole 12a in plan view.

As shown in FIGS. 3 and 4B, a plurality first cut-off portions 13a (index, the index hole) are formed on the first wall 15a. The first cut-off portions 13a are provided so as to serve as positioning marks of the optical surface 5e of the optical components 5. The first cut-off portions 13a are formed to penetrate through the first wall 15a in the range including the positions of the optical surface 5e in the extending direction.

The shape of the first cut-off portion 13a in plan view (ZX surface) is not particularly limited. For example, in the embodiment, as shown in FIG. 2C, the shape of the first cut-off portion 13a which is seen from the side thereof (Y-axial direction) is a rectangular shape that opens at the side in the upward vertical direction (+Z side).

As long as the first base member 1a can fix the optical components 5, the thickness and the material thereof is not particularly limited.

The second base member 1b is the same member as the first base member 1a.

As shown in FIG. 4A, the second base member 1b has a third wall 15b having a third holding surface 10b and a fourth wall 16b having a fourth holding surface 11b.

Similar to the first holes 12a of the first base member 1a, second holes 12b are formed on the fourth wall 16b.

Similar to the first cut-off portions 13a of the first base member 1a, second cut-off portions 13b are formed on the third wall 15b.

As shown in FIG. 2A, the first surface 5a of the optical components 5 are in contact with the first holding surface 10a of the first base member 1a without interposing the adhesive 30 therebetween. The second surface 5b of the optical component 5 is adhered to the second holding surface 11a of the first base member 1a with the adhesive 30 interposed therebetween. The third surface 5c of the optical component 5 is in contact with the third holding surface 10b of the second base member 1b without interposing the adhesive 30 therebetween. The fourth surface 5d of the optical component 5 is adhered to the fourth holding surface 11b of the second base member 1b with the adhesive 30 interposed therebetween. Consequently, the optical components 5 are held by the base unit 1.

The adhesive 30 adhesively fixes the base unit 1 and the optical components 5 is an elastic adhesive in the embodiment. The elastic adhesive is an elastically-deformable adhesive in a cured state. As the elastic adhesive, for example, a modified silicone adhesive having polypropylene oxide as a main component is adopted.

Next, the optical characteristics of the optical crystal assembly 2 will be described.

Figure 5A:
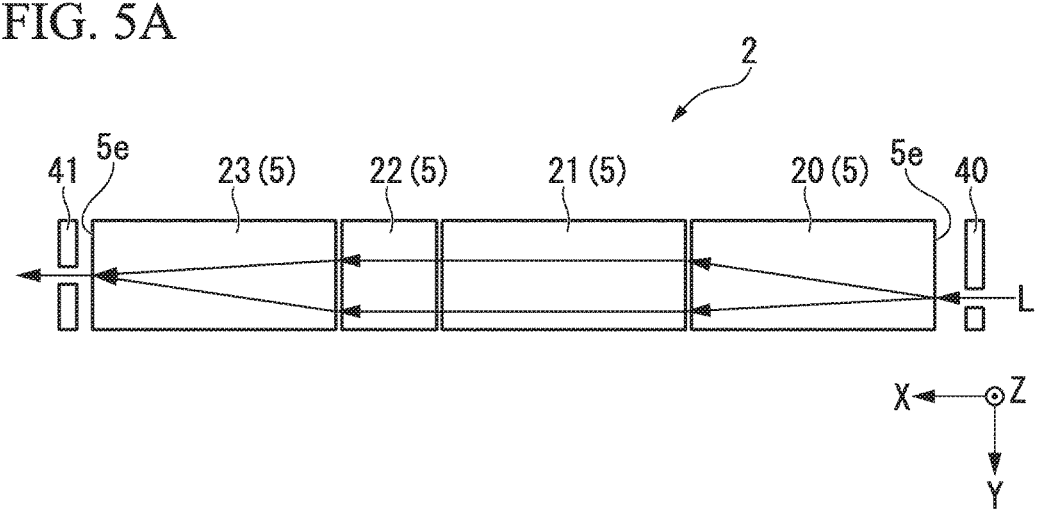
FIG. 5A is an explanatory diagram showing the optical characteristics of the optical crystal assembly according to the first embodiment.
Figure 5B:
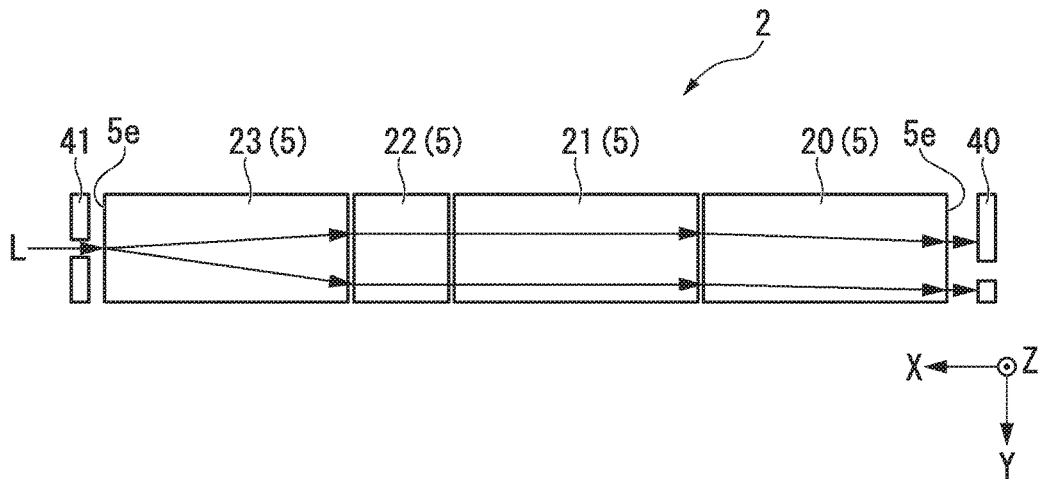
FIG. 5B is an explanatory diagram showing the optical characteristics of the optical crystal assembly according to the first embodiment.

FIGS. 5A and 5B are views illustrating the optical characteristics of the optical crystal assembly 2 used in a polarization-independent optical isolator. FIG. 5A is a view showing the case where light L is incident to the optical crystal assembly 2 in the forward direction. FIG. 5B is a view showing the case where light L is incident to the optical crystal assembly 2 in the backward direction. As shown in FIGS. 5A and 5B, an incident aperture 40 and an emission aperture 41 are provided at both the respective sides of the optical crystal assembly 2 in the longitudinal direction (X-axial direction). In FIGS. 5A and 5B, the base unit 1 is not shown. Additionally, the forward direction means the direction of the light L from the first polarizer 20 to the second polarizer 23 (+X direction, direction D shown in FIGS. 1B, 2B, and 2C). The backward direction means the direction of the light L from the second polarizer 23 to the first polarizer 20 (−X direction).

As shown in FIG. 5A, in the case where the light L is incident to the optical crystal assembly 2 in the forward direction, the light L enters the first polarizer 20 through the opening of the incident aperture 40. The light L which enters the first polarizer 20 is separated into ordinary light and extraordinary light by the first polarizer 20. Subsequently, the ordinary light and the extraordinary light which are emitted from the first polarizer 20 are incident to the second polarizer 23 through the faraday rotator 21 and the wave plate 22. Furthermore, the ordinary light and the extraordinary light which are separated are re-coupled to one light L in the second polarizer 23. The coupled light L is emitted from the opening of the emission aperture 41.

In contrast, as shown in FIG. 5B, in the case where the light L is incident to the optical crystal assembly 2 in the backward direction, the light L enters the second polarizer 23 through the opening of the emission aperture 41. The light which enters the second polarizer 23 is separated into ordinary light and extraordinary light by the second polarizer 23.

Subsequently, the ordinary light and the extraordinary light which are emitted from the second polarizer 23 are incident to the first polarizer 20 through the wave plate 22 and the faraday rotator 21. Here, in the case where the light L is incident in the backward direction, the direction in which polarization is rotated by the faraday rotator 21 is reversed. Consequently, in the first polarizer 20, the ordinary light and the extraordinary light are not refracted so that the directions of the lights intersect with each other, and the lights do not form one light. As a result, each of the ordinary light and the extraordinary light which are emitted from the first polarizer 20 is shielded by the incident aperture 40. Therefore, the light L is not emitted from the opening of the incident aperture 40.

As described above, the optical crystal assembly 2 used in the optical isolator has the optical characteristics of allowing the light L to be transmitted therethrough in the case where the light L is incident to the optical crystal assembly 2 in the forward direction. Additionally, the optical crystal assembly 2 has the optical characteristics of shielding the light L in the case where the light L is incident to the optical crystal assembly 2 in the backward direction. In other words, the plurality of the optical components 5 of the optical crystal assembly 2 are cooperated to each other, emit the incident light L, and shields the returned light L (light L in the backward direction) of the emitted light.

In the embodiment, since the alignment angle of the optical surface 5e of each optical component 5 is suitably determined with respect to the incident direction of the light L (X-axial direction) with a high degree of accuracy, the aforementioned optical characteristics are obtained. However, in the case where, for example, the alignment angles of the optical components 5 are displaced from the proper angle, there is a concern that the above-described optical characteristics are not obtained.

Figure 5C:
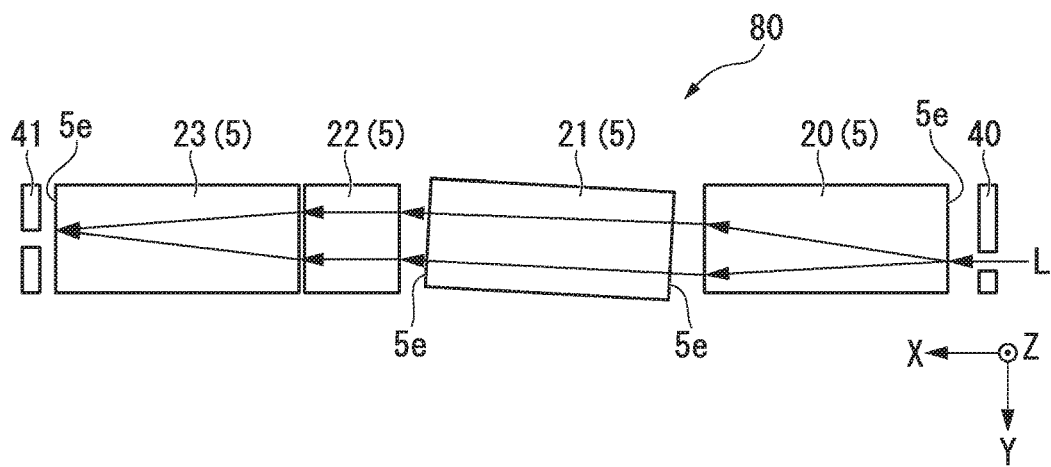
FIG. 5C is an explanatory diagram showing the optical characteristics of the optical crystal assembly according to the first embodiment.

FIG. 5C is a view showing the case different from the embodiment where light L is incident in the forward direction to an optical crystal assembly 80 in which a misaligned optical component 5 is arranged.

As shown in FIG. 5C, for example, the faraday rotator 21 is disposed in the optical crystal assembly 80 so that the alignment angle thereof is displaced from the proper position. In the foregoing case, the light L incident to the faraday rotator 21 is refracted in the direction different from that in the case where the faraday rotator 21 is accurately disposed.

As a result, the emission position of the light L obtained by coupling the ordinary light and the extraordinary light by the second polarizer 23 is displaced from the proper position, the intensity of the emitted light L decreases or the light L is shielded by the emission aperture 41. Accordingly, in the optical crystal assembly used in the optical isolator, the placement accuracy of each optical component 5 is of importance.

Next, a method of manufacturing an optical crystal assembly (a method of manufacturing an optical device) according to the embodiment will be described with reference to FIGS. 6 and 7A to 7D.

FIG. 6 is a flowchart showing a method of manufacturing an optical crystal assembly according to the embodiment.

FIGS. 7A to 7D are cross-sectional views (YZ cross-sectional view) showing steps of manufacturing the optical crystal assembly according to the embodiment.

As shown in FIG. 6, the method of manufacturing the optical crystal assembly according to the embodiment includes a first coating step S1, a second coating step S2, a first holding step (holding step) S3, a first curing step S4, a third coating step S5, a fourth coating step S6, a second holding step S7, and a second curing step S8.

Figure 7A:
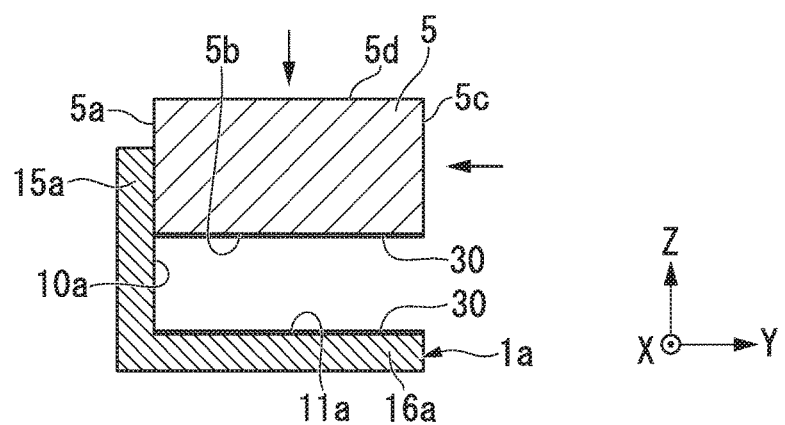
FIG. 7A is a cross-sectional view showing a step of manufacturing the optical crystal assembly according to the first embodiment.

Firstly, in the first coating step S1, as shown in FIG. 7A, the adhesive 30 is applied (supplied) on the second surface 5b of the optical component 5.

Next, in the second coating step S2, the adhesive 30 is applied (supplied) on the second holding surface 11a of the second wall 16a of the first base member 1a.

According to the first coating step S1 and the second coating step S2, each of the second surface 5b of each optical component 5 and the second holding surface 11a of the first base member 1a is coated with the adhesive 30.

Subsequently, in the first holding step S3, the plurality of the optical components 5, each of which has the optical surface 5e, are held by the first base member 1a in the extending direction of the first base member 1a (X-axial direction). As shown in FIG. 6, the first holding step S3 includes a first contacting step S3a and a first connecting step S3b.

Firstly, in the first contacting step S3a, as shown in FIG. 7A, the first surface 5a of the optical component 5 is in contact with the first holding surface 10a of the first wall 15a by being pressed thereagainst. According to the above steps, the position of the optical component 5 is fixed in the direction (Y-axial direction, second direction) perpendicular to the first holding surface 10a and the optical component is held by the first holding surface.

After that, in the first connecting step S3b, the second surface 5b of the optical component 5 to which the adhesive 30 is supplied is connected to the second holding surface 11a of the first base member 1a to which the adhesive 30 is supplied. As shown in FIG. 7A, the optical component 5 is directed to the first base member 1a from the upper side in the vertical direction (+Z side) and comes close thereto. Furthermore, the second surface 5b is adhered to the second holding surface 11a via the adhesive 30. According to the above steps, the position of the optical component 5 is fixed in the direction (Z-axial direction, third direction) perpendicular to the second holding surface 11a and the optical component is held by the second holding surface.

The above-described steps are carried out, the first holding step S3 is completed. According to the above steps, as shown in FIG. 7B, each optical component 5 is integrally held by the first base member 1a between the second holding surface 11a and the second surface 5b with the adhesive 30 interposed therebetween. the first holding step S3, the positioning of the optical components 5 in the extending direction (X-axial direction, first direction) is carried out by use of the first cut-off portions 13a as a mark.

Next, in the first curing step S4, the adhesive 30 interposed between the second holding surface 11a of the first base member 1a and the second surface 5b of each optical component 5 is cured. A method of curing the adhesive 30 can be adequately selected depending on the material used to form the adhesive. In the case where an elastic adhesive is used as the adhesive 30 as described in the embodiment, for example, a method of curing the adhesive 30 by leaving the adhesive for a predetermined amount of time can be selected.

Figure 7B:
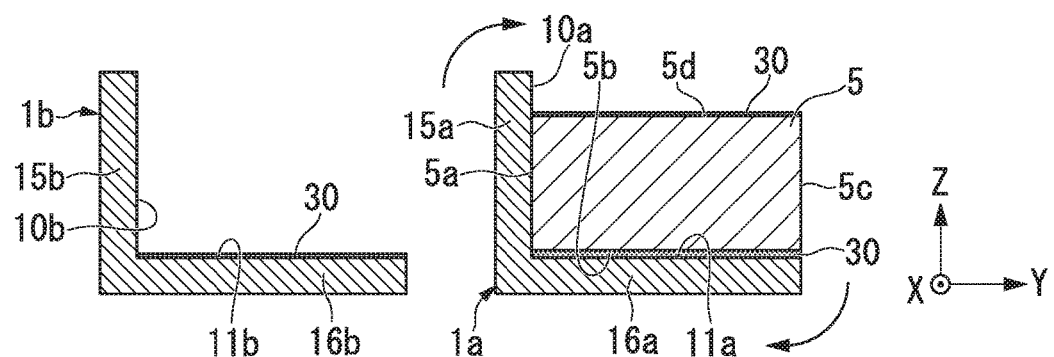
FIG. 7B is a cross-sectional view showing a step of manufacturing the optical crystal assembly according to the first embodiment.

Subsequently, in the third coating step S5, as shown in FIG. 7B, the adhesive 30 is applied (supplied) on the fourth surface 5d of the optical component 5.

Next, in the fourth coating step S6, the adhesive 30 is applied (supplied) on the fourth holding surface 11b of the fourth wall 16b of the second base member 1b. According to the third coating step S5 and the fourth coating step S6, as shown in FIG. 7B, each of the fourth surface 5d of each optical component 5 and the fourth holding surface 11b of the second base member 1b is coated with the adhesive 30.

Subsequently, in the second holding step S7, the optical components 5 which are integrated into the first base member 1a are inverted and are held by the second base member 1b. As shown in FIG. 6, the second holding step S7 includes a second contacting step S7a and a second connecting step S7b.

Figure 7C:
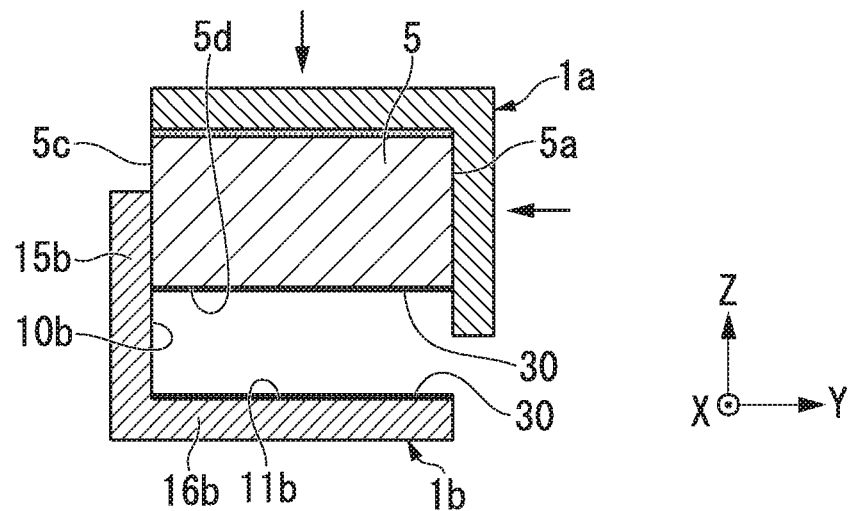
FIG. 7C is a cross-sectional view showing a step of manufacturing the optical crystal assembly according to the first embodiment.

Firstly, in the second contacting step S7a, the second base member 1b is disposed so that the fourth holding surface 11b coated with the adhesive 30 faces the upper side in the vertical direction (+Z side). Next, as shown by the arrows in FIG. 7B, the optical component 5 held by the first base member 1a is inverted. Particularly, as shown in FIG. 7C, the fourth surface 5d of the optical component 5 faces the lower side in the vertical direction (−Z side). Subsequently, the third surface 5c of the optical component 5 is in contact with the third holding surface 10b of the third wall 15b by being pressed thereagainst. According to the above steps, the position of the optical component 5 held by the first base member 1a is fixed in the direction (Y-axial direction) perpendicular to the third holding surface 10b and the optical component is held by the third holding surface.

After that, in the second connecting step S7b, the fourth surface 5d of the optical component 5 to which the adhesive 30 is supplied is connected to the fourth holding surface 11b of the second base member 1b to which the adhesive 30 is supplied. As shown in FIG. 7C, the optical component 5 held by the first base member 1a is directed to the second base member 1b from the upper side in the vertical direction (+Z side) and comes close thereto. Furthermore, the fourth surface 5d is adhered to the fourth holding surface 11b via the adhesive 30. According to the above steps, the position of the optical component 5 held by the first base member 1a is fixed in the direction (Z-axial direction) perpendicular to the fourth holding surface 11b and the optical component is held by the fourth holding surface.

Figure 7D:
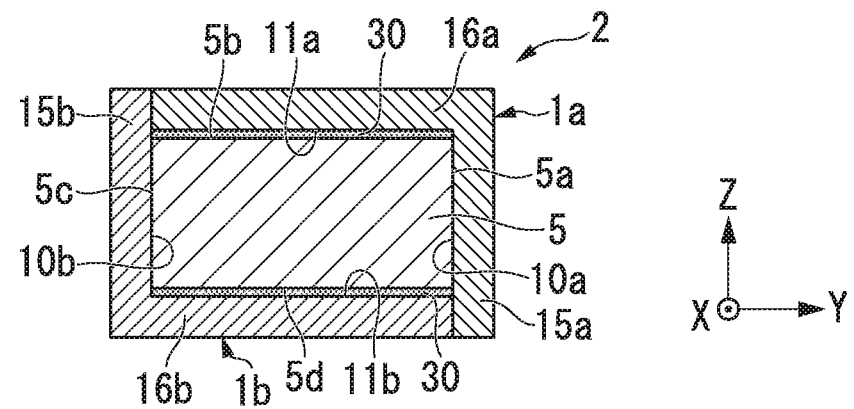
FIG. 7D is a cross-sectional view showing a step of manufacturing the optical crystal assembly according to the first embodiment.

The above-described steps are carried out, the second holding step S7 is completed. According to the above steps, as shown in FIG. 7D, the adhesive 30 interposed between the fourth holding surface 11b and the fourth surface 5d, and each optical component 5 is held by the second base member 1b. In the second holding step S7, the positioning of the optical components 5 in the extending direction (X-axial direction, first direction) is carried out by use of the second cut-off portions 13b as a mark.

Next, in the second curing step S8, the adhesive 30 interposed between the fourth holding surface 11b of the second base member 1b and the fourth surface 5d of each optical component 5 is cured. As a method of curing resin, the same method as that in the first curing step S4 can be adopted.

The above-described steps are carried out, as shown in FIG. 7D, the optical crystal assembly 2 according to the embodiment in which the optical components 5 are integrally held by the first base member 1a and the second base member 1b is manufactured.

Particularly, FIG. 7D shows a state where the optical crystal assembly 2 is inverted from the states shown in FIGS. 1A, 1B, 2A, 2B, and 2C.

According to the embodiment, the optical crystal assembly in which the optical components 5 are arranged with a high degree of accuracy is obtained. Hereinbelow, the explanation with reference to drawings is as follows.

Figure 8A:
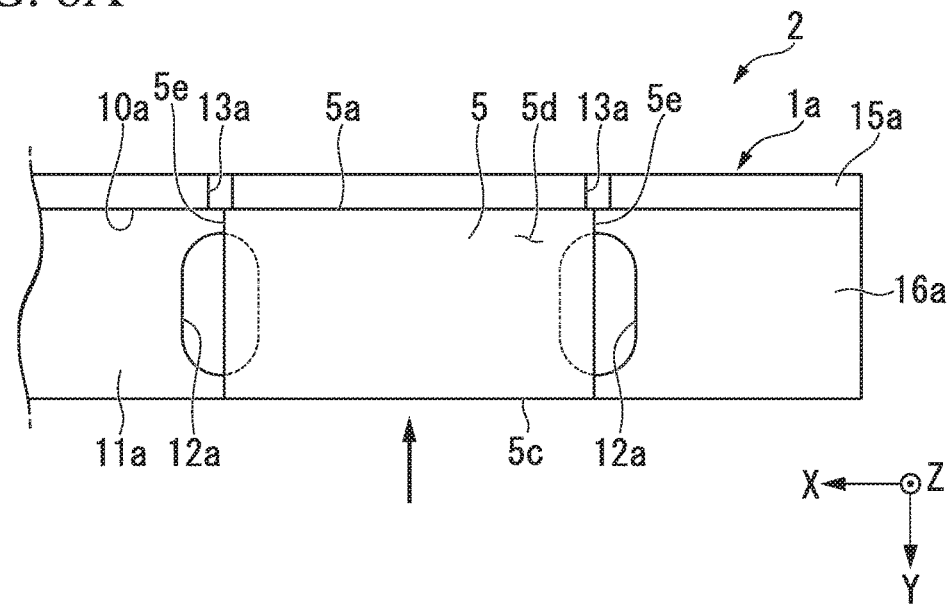
FIG. 8A is an explanatory diagram showing an effect of the optical crystal assembly according to the first embodiment.
Figure 8B:
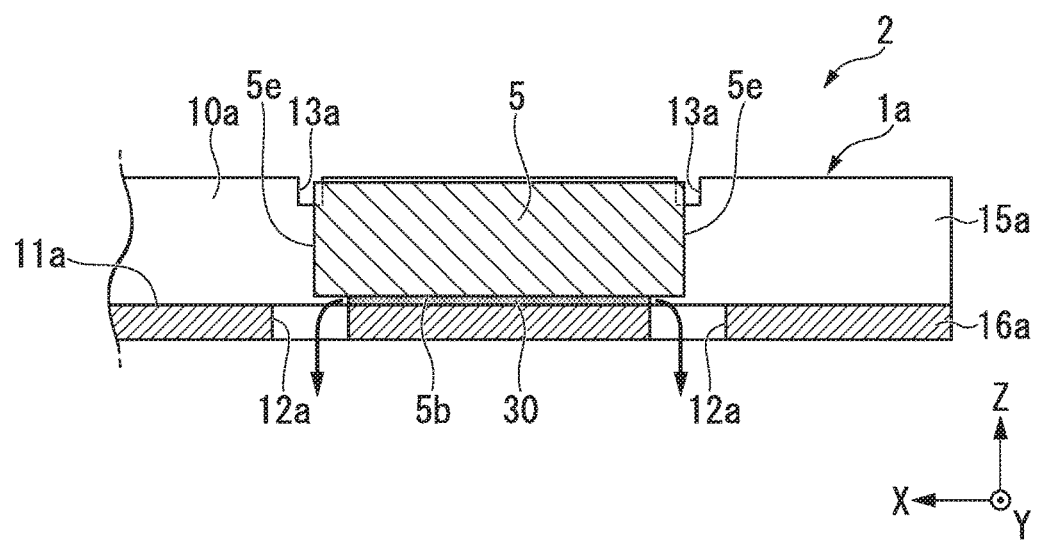
FIG. 8B is an explanatory diagram showing an effect of the optical crystal assembly according to the first embodiment.

FIGS. 8A and 8B are explanatory diagrams showing an effect of the optical crystal assembly 2 according to the embodiment.

According to the embodiment, as shown in FIG. 8A, as a result of pressing the first surface 5a of the optical component 5 against the first holding surface 10a of the first base member 1a and thereby causing the first surface to come into contact with the first holding surface, the position of the optical component is fixed in the direction (Y-axial direction) perpendicular to the first holding surface 10a with a high degree of accuracy. The adhesive 30 is not interposed between the first holding surface 10a and the first surface 5a. Consequently, in a state where the first surface 5a is in contact with the first holding surface 10a, the second surface 5b of the optical component 5 can come close to the second holding surface 11a of the first base member 1a. Accordingly, since the second surface 5b of the optical component 5 is connected to the second holding surface 11a with the adhesive 30 interposed therebetween, the positions of the optical components 5 are fixed to the second holding surface 11a in the direction (Z-axial direction) perpendicular to the second holding surface with a high degree of accuracy. For this reason, the optical crystal assembly in which the optical components 5 are linearly arranged along the extending direction of the base unit 1 (X-axial direction) with a high degree of accuracy is obtained.

Moreover, according to the embodiment, as shown in FIGS. 8A and 8B, the first holes 12a are formed on the second holding surface 11a of the second wall 16a. The first hole 12a is formed so as to include at least part of the region which intersects with the optical surface 5e of the optical component 5. Consequently, even in the case where the amount of the adhesive 30 that adhesively attaches the second surface 5b of the optical component 5 to the second holding surface 11a, the excess adhesive 30 is discharged from the first hole 12a toward the lower side in the vertical direction (−Z side) as shown by the arrow in FIG. 8B. Because of this, the excess adhesive 30 is prevented from coming around the optical surface 5e of the optical component 5, the optical crystal assembly having a high degree of reliability is obtained.

Furthermore, according to the embodiment, the first cut-off portions 13a are formed on the first holding surface 10a of the first wall 15a. The first cut-off portions 13a are formed in the range including the positions of the optical surface 5e in the extending direction (X-axial direction). Consequently, when the optical components 5 are held by the first base member 1a, the first cut-off portions 13a are used as marks, a method of fixing the positions of the optical components 5 in the extending direction can be adopted.

Moreover, in the embodiment, the first cut-off portion 13a is formed so as to be located in the range of the first hole 12a in the extending direction. That is, as shown in FIG. 4B, the width W3 of the first hole 12a is wider than the width W4 of the first cut-off portion 13a. Therefore, as long as the first cut-off portion 13a is formed in the above range in the extending direction, even in the case where the optical component 5 is disposed so that the optical surface 5e is located at any positions, the position of the optical surface 5e in the extending direction can be within the range of the first hole 12a in the extending direction. In other words, the optical component can be held by the first base member 1a so that the optical surface 5e is located above the first hole 12a.

Additionally, the second cut-off portions 13b are formed on the third holding surface 10b of the third wall 15b.

The second cut-off portions 13b are formed in the range including the positions of the optical surface 5e in the extending direction (X-axial direction). Consequently, in a way similar to the above case, the optical component 5 can be easily held by the second base member 1b so that the position of the optical surface 5e of the optical component 5 in the extending direction can be within the range of the second hole 12b in the extending direction.

Furthermore, according to the embodiment, since each optical components 5 are sandwiched and held between the first base member 1a and the second base member 1b, the optical crystal assembly is obtained in which the optical components 5 have a high degree of adhesion strength.

According to the embodiment, the area of the second surface 5b of the optical component 5 is larger than the area of the first surface 5a. Because of this, by selecting the second surface 5b as the surface to which the adhesive 30 is to be applied and which is to be adhesively attached to the second holding surface 11a of the first base member 1a, it is possible to increase the surface area on which the optical component 5 is to be adhered to the first base member 1a with the adhesive 30 interposed therebetween. As a result, it is possible to improve the adhesion strength of the optical components 5.

Furthermore, the area of the fourth surface 5d of the optical component 5 is larger than the area of the third surface 5c. Because of this, by selecting the fourth surface 5d as the surface to which the adhesive 30 is to be applied and which is to be adhesively attached to the fourth holding surface 11b of the second base member 1b, it is possible to increase the surface area on which the optical component 5 is to be adhered to the second base member 1b with the adhesive 30 interposed therebetween. As a result, it is possible to improve the adhesion strength of the optical components 5.

Furthermore, according to the embodiment, since the elastic adhesive is used as the adhesive 30, it is possible to prevent the optical characteristics of the optical device from being degraded.

In the case where the optical component 5 is fixed to the base unit 1 via solder or epoxy adhesive, when the optical component 5 and the base unit 1 are thermally expanded, a stress is generated between the optical component 5 and the base unit 1. The reason for this is that, the coefficient of thermal expansion of the optical component 5 is different from that of the base unit 1. In the case where such a stress is applied to the optical component 5, the optical characteristics of the optical component 5 vary, and the optical characteristics of the entire optical crystal assembly may be degraded.

In contrast, in the embodiment, the plurality of the optical components 5 is adhered to the base unit 1 via the elastic adhesive. Accordingly, a stress that occurs due to thermal expansion is absorbed by the elastic adhesive. Therefore, it is possible to prevent the optical characteristics of the optical components 5 from being degraded.

Furthermore, according to the embodiment, in the first coating step S1 and the second coating step S2, the adhesive 30 is applied on both the second holding surface 11a of the first base member 1a and the second surface 5b of the optical component 5.

Consequently, since both the adhered surfaces are coated with the adhesive 30, it is possible to prevent an air space from being generated at the adhesive interface when the second holding surface 11a adhesively attached to the second surface 5b of the optical component 5.

Also in the third coating step S5 and the fourth coating step S6, the same effect as the above is obtained.

Accordingly, the optical crystal assembly having a high degree of adhesion strength between the optical components 5 and the base unit 1 is obtained.

Moreover, according to the embodiment, in the second holding step S7, the optical components 5 held by the first base member 1a are inverted, directed to the second base member 1b from the upper side in the vertical direction, and are held by the second base member. For this reason, of the adhesive 30 which is applied between the fourth holding surface 11b of the second base member 1b and the fourth surface 5d of the optical component 5, the excess adhesive 30 is discharged from the second hole 12b to the lower side in the vertical direction.

As a result, when the second base member 1b holds the optical components 5, it is possible to prevent the adhesive 30 from coming around the optical surface 5e.

Furthermore, in the first curing step S4 of the embodiment, the adhesive 30 between the second holding surface 11a and the second surface 5b of the optical component 5 is cured. Because of this, when the optical components 5 are inverted in the second holding step S7, it is possible to prevent the adhesive 30 which is interposed between the second holding surface 11a and the second surface 5b from flowing to the lower side in the vertical direction. As a result, it is possible to prevent the adhesive 30 from coming around the optical surface 5e.

In other cases, in the embodiment, the following configuration and method can be adopted.

The first hole 12a may be provided so that only one optical surface 5e overlaps a first hole 12a in plan view. In this case, since it is possible to reduce the surface area at which the first hole 12a penetrates through the second wall 16a, it is possible to improve the strength of the base unit 1.

In addition, the width W4 of the first cut-off portion 13a may be larger than the width W3 of the first hole 12a.

One of the first cut-off portion 13a and the second cut-off portion 13b may not be formed or both them may not be formed.

Furthermore, instead of the first cut-off portion 13a and the second cut-off portion 13b, a configuration may be adopted which provides an index that is used as a positioning mark in the extending direction of the base unit 1 (X-axial direction) when the optical components 5 are disposed. The configuration of the index is not particularly limited, for example, a configuration may be adopted which forms a recess or a protuberance on the first wall 15a and the third wall 15b, or a configuration may be adopted which provides an alignment mark on the first wall 15a and the third wall 15b.

The second base member 1b may be formed in a shape different from that of the first base member 1a.

The second hole 12b may not be formed.

The base unit 1 may not include the second base member 1b.

The adhesive 30 may not be the elastic adhesive.

In the first curing step S4, as long as the adhesive 30 is prevented from flowing, the adhesive 30 may be semi-cured. In this case, another main curing step may be provided.

The first curing step S4 and the second curing step S8 may be omitted.

The first coating step S1 or the second coating step S2 may be omitted. That is, the first base member 1a may be adhered to the optical component 5 by applying the adhesive 30 to the second holding surface 11a or the second surface 5b.

Also, the third coating step S5 or the fourth coating step S6 may be omitted. That is, the second base member 1b may be adhered to the optical component 5 by applying the adhesive 30 to the fourth holding surface 11b or the fourth surface 5d.

In the second holding step S7, the optical components 5 held by the first base member 1a may not be inverted. In this case, the second base member 1b is directed to the optical component 5 held by the first base member 1a from the upper side in the vertical direction (+Z side) and comes close thereto, and the optical components 5 may be held by the second base member 1b.

Next, a second embodiment will be described.

The second embodiment is different from the first embodiment in that the first base member includes a third wall having a third holding surface.

Particularly, identical reference numerals are used for the elements which are identical to those of the above-mentioned embodiment, and the explanations thereof are omitted here.

Figure 9A:
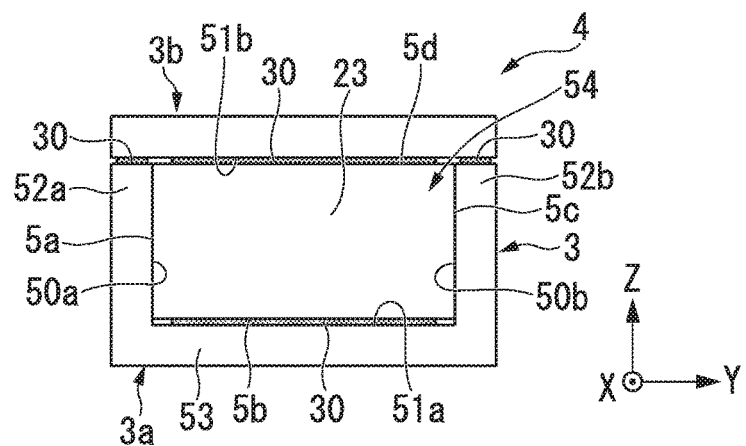
FIG. 9A is a front view showing an optical crystal assembly according to a second embodiment.
Figure 9B:
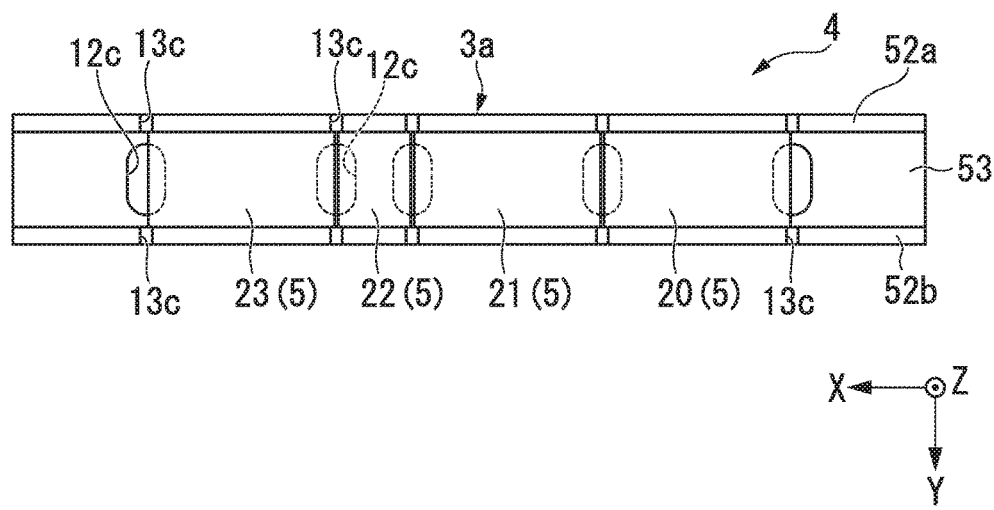
FIG. 9B is a plan view showing the optical crystal assembly according to the second embodiment.

FIGS. 9A and 9B are views showing an optical crystal assembly 4 according to the embodiment. FIG. 9A is a front view and FIG. 9B is a plan view. In FIG. 9B, a second base member 3b is not shown.

As shown in FIGS. 9A and 9B, the optical crystal assembly 4 according to the embodiment includes the optical components 5 and a base unit 3.

Figure 10:
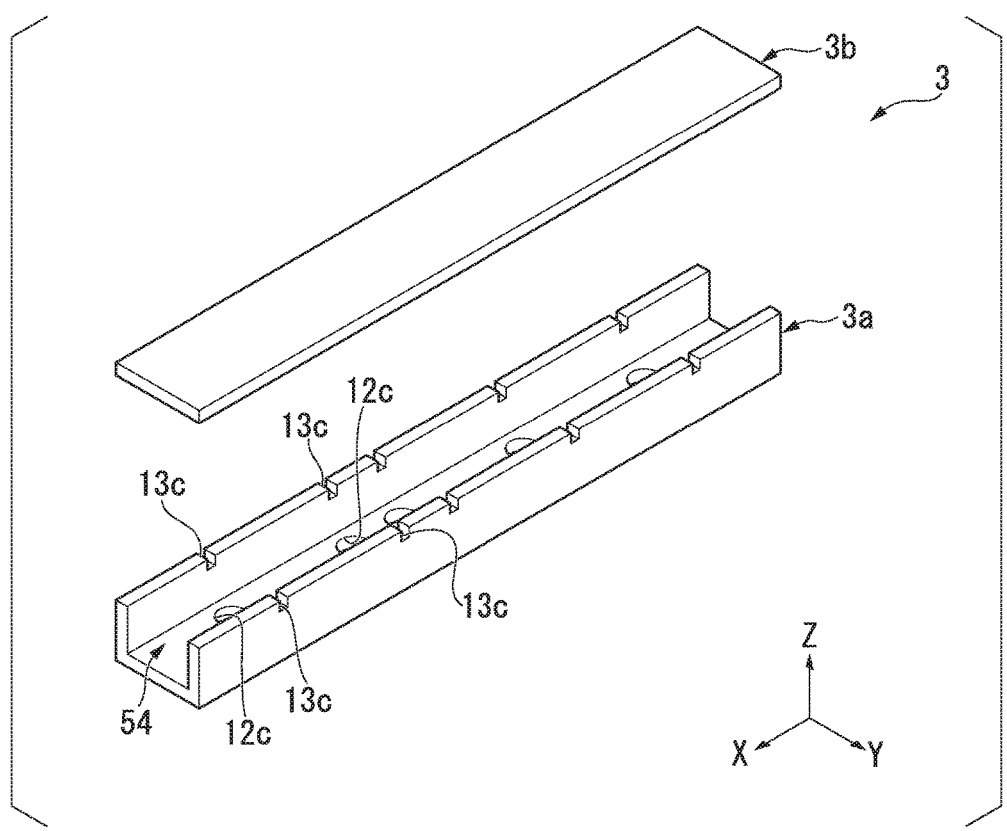
FIG. 10 is a perspective view showing a base unit according to the second embodiment.
Figure 11A:
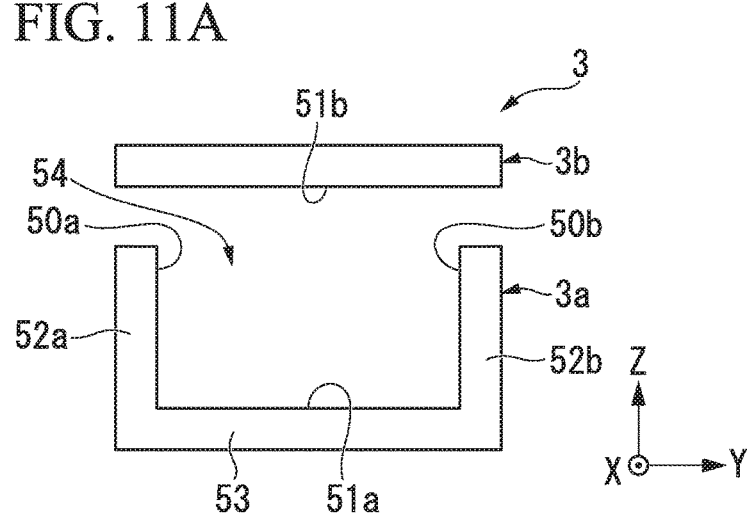
FIG. 11A is a front view showing the base unit according to the second embodiment.
Figure 11B:
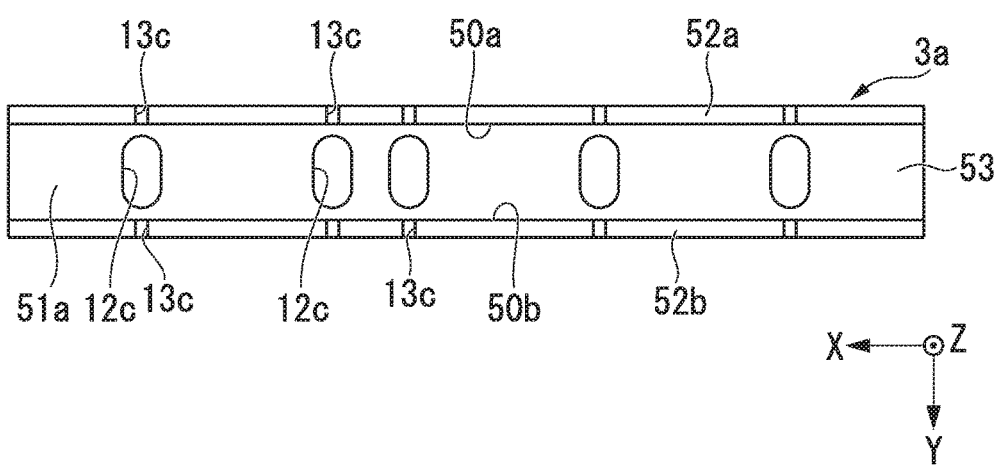
FIG. 11B is a plan view showing the base unit according to the second embodiment.

FIGS. 10, 11A, and 11B are views showing the base unit 3. FIG. 10 is a perspective view. FIG. 11A is a front view (YZ surface). FIG. 11B is a plan view (XY surface). In FIG. 11B, the second base member 3b is not shown.

As shown in FIGS. 10 and 11A, the base unit 3 includes a first base member 3a and the second base member 3b.

The first base member 3a includes: a first wall 52a having a first holding surface 50a; a second wall 53 having a second holding surface 51a; and a third wall 52b having a third holding surface 50b. A groove 54 is formed by the first wall 52a, the second wall 53, and the third wall 52b.

As shown in FIG. 11B, holes (first hole) 12c that penetrate through the second wall 53 in the direction (Z-axial direction) perpendicular to the second holding surface 51a are formed on the second holding surface 51a.

Cut-off portions (index hole, the index) 13c are formed on the first wall 52a and the third wall 52b. The cut-off portions 13c penetrate through each of the first wall 52a and the third wall 52b in the thickness direction thereof.

As shown in FIG. 10, the second base member 3b is a plate-shaped member formed in a rectangular shape in plan view. As shown in FIG. 11A, the second base member 3b has the fourth holding surface 51b.

As shown in FIG. 9A, each optical component 5 is accommodated in the groove 54 of the first base member 3a. Accordingly, the opening of the groove 54 is sealed by the second base member 3b, and therefore the optical components 5 are held by the base unit 3. The first surface 5a of the optical component 5 are in contact with the first holding surface 50a of the first base member 3a without interposing the adhesive 30 therebetween. The second surface 5b of the optical component 5 is adhered to the second holding surface 51a of the first base member 3a with the adhesive 30 interposed therebetween. The third surface 5c of the optical component 5 is in contact with the third holding surface 50b of the first base member 3a without interposing the adhesive 30 therebetween. The fourth surface 5d of the optical component 5 is adhered to the fourth holding surface 51b of the second base member 3b with the adhesive 30 interposed therebetween.

Additionally, the second base member 3b is adhered to the first wall 52a and the third wall 52b of the first base member 3a with the adhesive 30 interposed therebetween.

According to the embodiment, as a result of inserting the optical components 5 into the groove 54 formed in the first base member 3a, it is possible to fix the positions of the optical components 5 in the direction (Y-axial direction) perpendicular to the first holding surface 50a and the third holding surface 50b. Furthermore, since the adhesive 30 is not interposed between the first holding surface 50a and the third holding surface 50b and the first surface 5a and the third surface 5c, the second surface 5b of the optical component 5 can come close to the second holding surface 51a in a state where the positions of the optical components 5 are fixed in the direction perpendicular to the first holding surface 50a and the third holding surface 50b. Accordingly, as a result of adhesively attaching the second surface 5b to the second holding surface 51a, it is possible to fix the positions of the optical components 5 the direction (Z-axial direction) perpendicular to the second holding surface 51a. For this reason, the optical crystal assembly in which the optical components 5 are linearly arranged along the extending direction of the base unit 1 (X-axial direction) with a high degree of accuracy is obtained.

In other cases, in the embodiment, the following configuration may be adopted.

A hole which penetrates through the second base member 3b in the direction (Z-axial direction) perpendicular to the fourth holding surface 51b may be formed on the fourth holding surface 51b of the second base member 3b so that the hole includes at least part of the region which intersects with the optical surface 5e of the optical component 5. Consequently, when the second base member 3b is adhered to the fourth surface 5d of the optical component 5, the excess adhesive 30 is discharged through the hole to the outside. In this case, in the case of adhesively attaching the second base member 3b to the optical components, a method of causing the optical component 5 to come close to the second base member 3b from the upper side in the vertical direction and adhesively attaching the optical component to the second base member may be adopted.

The second base member 3b may not be provided.

The cut-off portions 13c may not be formed on the first wall 52a or the third wall 52b.

Additionally, the cut-off portions 13c may not be formed on both the first wall 52a and the third wall 52b.

Next, an optical crystal assembly 2A which is Example according to the first embodiment and is practically manufactured will be described.

The optical crystal assembly 2A was configured to include a first polarizer, a second polarizer, a faraday rotator, and a wave plate. As the first polarizer and the second polarizer, $YVO_4$ was used. As the faraday rotator, TGG single crystal was used. As the wave plate, a $\lambda/2$ plate made of quartz crystal was used.

The length of the first base member and the second base member that hold the optical components in the extending direction was 78.68 mm. The width of the contact wall (contact surface) was 2.3 mm. The width of the adhesion wall (adhesion surface) was 5.5 mm. The thickness of each of the base members was 0.4 mm.

Four holes were formed on each adhesion wall. The holes were formed on each adhesion surface so as to penetrate through at least part of the region intersecting with the optical surface of the optical component. The hole was a 2×3 oval hole formed in an oval shape in plan view.

Cut-off portions that penetrate through the contact wall was formed on each contact wall. The cut-off portions were formed so as to include the position of the optical surface of each optical component in the extending direction. The shape of the cut-off portion in plan view (ZX surface) was a rectangular shape. The length of the cut-off portion in the extending direction (X-axial direction) was 0.5 mm. The length of the cut-off portion in the height direction (Z-axial direction) was 1 mm.

Next, as the Example of the optical isolator using the aforementioned optical crystal assembly 2A, a practically-manufactured polarization-independent optical isolator 70 will be described.

Figure 12:
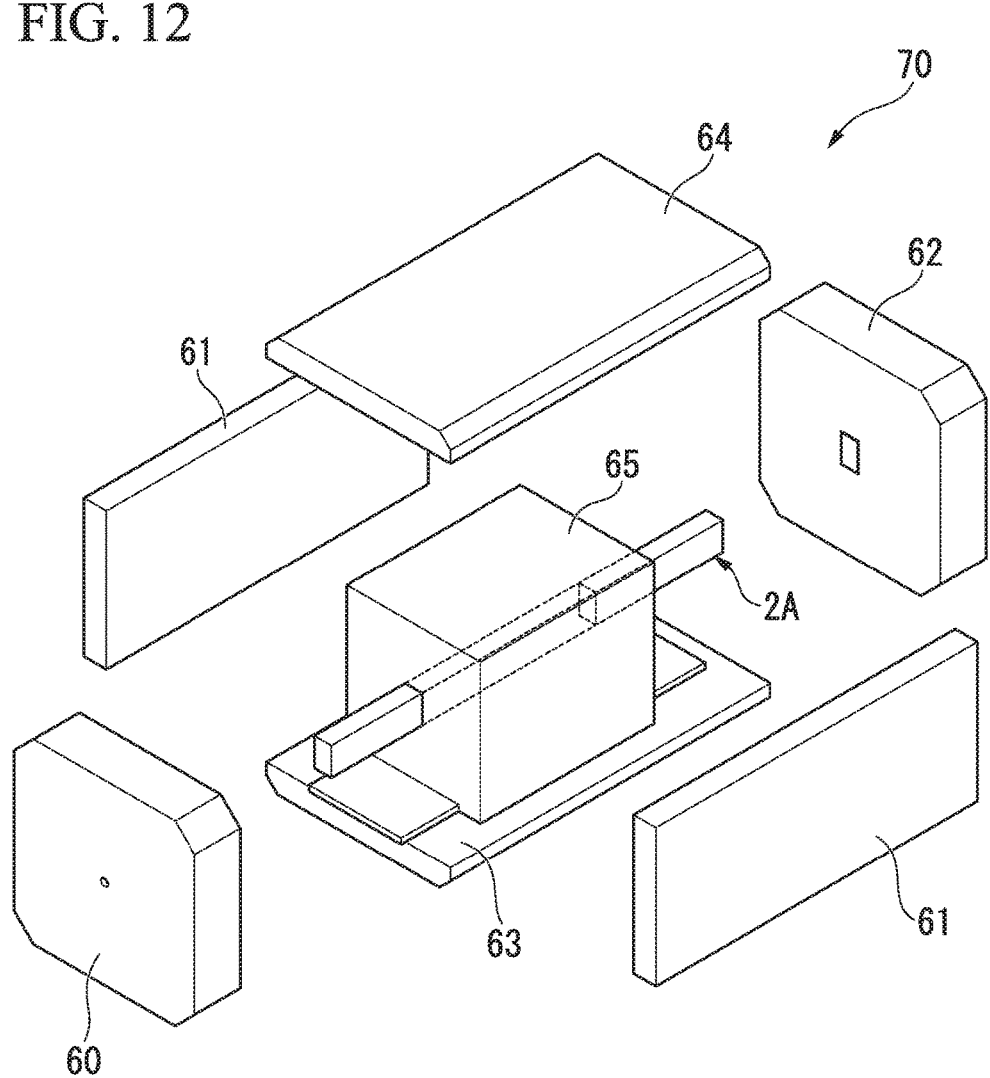
FIG. 12 is an exploded perspective view showing an optical isolator which is manufactured by the first embodiment in Example.

FIG. 12 is an exploded perspective view showing the manufactured optical isolator 70.

As shown in FIG. 12, firstly, the optical crystal assembly 2A was inserted into a magnetic circuit 65. Subsequently, a front panel 60, a side panel 61, a rear panel 62, a bottom panel 63, and a top panel 64 were provided so as to cover the optical crystal assembly 2A that is inserted into the magnetic circuit 65. Accordingly, the optical isolator 70 using the optical crystal assembly 2A was manufactured. An aperture is provided on each of the front panel 60 and the rear panel 62. Therefore, light entering the optical crystal assembly can be passed therethrough or blocked.

Moreover, as Comparative Example 1, an optical isolator was manufactured which uses one flat-plate member that serves as a base member fixing the optical components. The configuration of optical components is the same as that of the aforementioned Example.

Additionally, as Comparative Example 2, an optical isolator was manufactured which is only different from the optical isolator 70 of the aforementioned Example in that holes are not formed on the base member of the optical crystal assembly.

Fiber laser was incident to the optical isolator 70 of the Example and the optical isolators of the Comparative Examples 1 and 2 which were manufactured. As a result, in the optical isolator of the Comparative Example 1, desired optical characteristics cannot be obtained. The reason is believed to be that, each optical component is misaligned when the optical components are held by the base member.

Furthermore, in the optical isolator of the Comparative Example 2, it is seen that the optical component of the optical crystal assembly is damaged. The reason is believed to be that, in the Comparative Example 2, the optical surface of the optical component is contaminated by a fixing adhesive which comes therearound.

In contrast, in the optical isolator 70 of the Example, desired optical characteristics are obtained. The reason is believed to be that, in the Example, the positions of the optical components are fixed to the base member with a high degree of accuracy by the contact surface and the adhesion surface of the first base member and the second base member. According to the Example, it was apparent that the optical crystal assembly and the optical isolator in which the optical components are arranged with a high degree of accuracy are obtained.

Furthermore, it was seen that, the optical components of the optical isolator 70 of the Example are not damaged. The reason is believed to be that, in the Example, since the hole is formed on each base member, an excess adhesive is discharged through the hole, and the adhesive is prevented from coming around the optical surface. According to the Example, it was apparent that the optical crystal assembly and the optical isolator which can prevent the adhesive from coming around the optical surface and which has a high degree of reliability.

In the aforementioned Example, the optical crystal assembly according to the first embodiment is used; however, the optical crystal assembly according to the second embodiment may be used.

Moreover, in the aforementioned embodiment, an example is described in which the invention is applied to the optical crystal assembly used in a polarization-independent optical isolator; however, the invention is not limited to this. For example, the invention is applicable to an optical crystal assembly used in a polarization-dependent optical isolator or an optical crystal assembly used in an optical circulator.

What is claimed is:

1. An optical device comprising:
   a plurality of optical components arranged along a first direction, each optical component having an optical surface, a first surface intersecting with the optical surface, and a second surface intersecting with the optical surface and the first surface; and
   a base member that integrally holds the plurality of the optical components and has a first holding surface and a second holding surface, the first holding surface holding the optical components and fixing positions of the optical components in a second direction intersecting with the first direction in a state of being in contact with the optical components on the first surface, the second holding surface holding the second surface of the optical components with an adhesive interposed therebetween and fixing positions of the optical components in a third direction intersecting with the first direction and the second direction;
   wherein the base member comprises an index serving as a mark for fixing a position of the optical surface in the first direction,
   the base member comprises a first wall having the first holding surface,
   the index comprises an index hole that penetrates through the first wall in the range in the first direction of the optical surface,
   the base member is formed in an L-shape in a cross-section by the first wall and the second wall,
   the index hole is a notch portion provided at a distal end of the first wall and formed entirely in the first wall.

2. The optical device according to claim 1, wherein an area of the second surface is larger than an area of the first surface.

3. The optical device according to claim 1, wherein the optical component is formed in a rectangular shape in which a direction thereof intersects with the first direction and has a third surface disposed at a position opposite to the first surface and a fourth surface disposed at a position opposite to the second surface, and
   the optical device further comprises a second base member including: a third holding surface that comes into contact with the third surface and holds the optical components; and a fourth holding surface that holds the fourth surface of the optical component with an adhesive interposed therebetween.

4. The optical device according to claim 1, wherein the optical component is formed in a rectangular shape in which a direction thereof intersects with the first direction and has a third surface disposed at a position opposite to the first surface and a fourth surface disposed at a position opposite to the second surface,
   the base member includes a third holding surface that comes into contact with the third surface and holds the optical components, and
   the optical device further comprises a second base member including a fourth holding surface that holds the fourth surface of the optical component with an adhesive interposed therebetween.

5. The optical device according to claim 3, wherein the second base member comprises a third wall having the third holding surface and a fourth wall having the fourth holding surface, and
   the fourth wall has a second hole that penetrates through the fourth wall in the range including at least part of a region intersecting with the optical surface on the fourth holding surface.

6. The optical device according to claim 1, wherein the adhesive is an elastic adhesive.

7. An optical isolator comprising:
   the optical device according to claim 1.

8. A method of manufacturing an optical device, comprising:
   preparing a base member having a first holding surface and a second holding surface;
   preparing a plurality of optical components, each optical component having an optical surface, a first surface intersecting with the optical surface, and a second surface intersecting with the optical surface and the first surface;
   causing the first surface intersecting with the optical surface of the optical components to come into contact with the first holding surface of the base member without interposing an adhesive on the first holding surface;
   positioning the optical components in a second direction intersecting with a first direction and holding the optical components;
   sliding the first surface of the optical component along the first holding surface of the base member toward the second holding surface from an upper side in the vertical direction in a state where the first surface intersecting with the optical surface of the optical components comes into contact with the first holding surface of the base member;
   contacting the second surface intersecting with the optical surface and the first surface of the optical component with the second holding surface of the base member with an adhesive interposed therebetween;

fixing positions of the optical components in a third direction intersecting with the first direction and the second direction; and holding the plurality of the optical components on the base member along the first direction.

9. The method of manufacturing an optical device according to claim 8, further comprising:

supplying the adhesive to the second surface of the optical component;

supplying the adhesive to the second holding surface of the base member; and connecting the second surface to which the adhesive is supplied and the second holding surface to which the adhesive is supplied.

10. The method of manufacturing an optical device according to claim 8, further comprising:

preparing a second base member that comprises a third wall having a third holding surface and a fourth wall having a fourth holding surface; and inverting the optical components held by the base member and holding the optical components on the second base member, wherein when the optical components are inverted and held by the second base member, a third surface disposed at a position opposite to the first surface of the optical component comes into contact with the third holding surface of the second base member, and a fourth surface disposed at a position opposite to the second surface of the optical component is held by the fourth holding surface of the second base member with an adhesive interposed therebetween, the base member comprises a first wall having the first holding surface and a second wall having the second holding surface, the second wall has a first hole that penetrates through the second wall in the range including at least part of a region intersecting with the optical surface on the second holding surface, the fourth wall has a second hole that penetrates through the fourth wall in the range including at least part of a region intersecting with the optical surface on the fourth holding surface, when the plurality of the optical components are arranged on the base member along the first direction, the plurality of the optical components are directed to the base member from above in a vertical direction and are held by the base member, and when the optical components are inverted and held by the second base member, the plurality of the optical components held by the base member are directed to the second base member from an upper side in a vertical direction and are held by the second base member.

11. An optical device comprising:

a plurality of optical components arranged along a first direction, each optical component having an optical surface, a first surface intersecting with the optical surface, and a second surface intersecting with the optical surface and the first surface; and a base member that integrally holds the plurality of the optical components and has a first holding surface and a second holding surface, the first holding surface holding the optical components and fixing positions of the optical components in a second direction intersecting with the first direction in a state of being in contact with the optical components on the first surface, the second holding surface holding the second surface of the optical components with an adhesive interposed therebetween and fixing positions of the optical components in a third direction intersecting with the first direction and the second direction, wherein the base member comprises a second wall having the second holding surface, and the second wall has a first hole that is a hole and penetrates through the second wall in the range including at least part of a region intersecting with the optical surface on the second holding surface.

12. The optical device according to claim 11, wherein an area of the second surface is larger than an area of the first surface.

13. The optical device according to claim 11, wherein the optical component is formed in a rectangular shape in which a direction thereof intersects with the first direction and has a third surface disposed at a position opposite to the first surface and a fourth surface disposed at a position opposite to the second surface, and the optical device further comprises a second base member including: a third holding surface that comes into contact with the third surface and holds the optical components; and a fourth holding surface that holds the fourth surface of the optical component with an adhesive interposed therebetween.

14. The optical device according to claim 11, wherein the optical component is formed in a rectangular shape in which a direction thereof intersects with the first direction and has a third surface disposed at a position opposite to the first surface and a fourth surface disposed at a position opposite to the second surface, the base member includes a third holding surface that comes into contact with the third surface and holds the optical components, and the optical device further comprises a second base member including a fourth holding surface that holds the fourth surface of the optical component with an adhesive interposed therebetween.

15. The optical device according to claim 13, wherein the second base member comprises a third wall having the third holding surface and a fourth wall having the fourth holding surface, and the fourth wall has a second hole that penetrates through the fourth wall in the range including at least part of a region intersecting with the optical surface on the fourth holding surface.

16. The optical device according to claim 11, wherein the adhesive is an elastic adhesive.

17. An optical isolator comprising:

the optical device according to claim 11.

18. The optical device according to claim 1 wherein an opening, of index hole and facing away from the first wall, abuts another wall placed on the base member.

* * * * *